(12) United States Patent
Johnson et al.

(10) Patent No.: US 8,201,467 B2
(45) Date of Patent: Jun. 19, 2012

(54) DUAL DRIVE ELECTROMECHANICAL ACTUATOR WITH CENTER OUTPUT

(75) Inventors: Andrew T. Johnson, Scottsdale, AZ (US); Casey Hanlon, Queen Creek, AZ (US); Kellan Geck, Chandler, AZ (US)

(73) Assignee: Honeywell International Inc., Morristown, NJ (US)

( * ) Notice: Subject to any disclaimer, the term of this patent is extended or adjusted under 35 U.S.C. 154(b) by 879 days.

(21) Appl. No.: 12/237,978

(22) Filed: Sep. 25, 2008

(65) Prior Publication Data

US 2010/0072842 A1    Mar. 25, 2010

(51) Int. Cl.
*F16H 27/02*    (2006.01)
*F16H 29/02*    (2006.01)

(52) U.S. Cl. ............ 74/89; 74/89.27; 74/89.29; 74/831; 74/832; 310/80; 318/560; 318/567

(58) Field of Classification Search ........... 74/89, 89.27, 74/89.29, 89.3, 89.31, 89.34, 831, 832, 833; 318/38, 43, 48, 50, 560, 567; 310/112, 75 R, 310/83, 80

See application file for complete search history.

(56) References Cited

U.S. PATENT DOCUMENTS

| | | | |
|---|---|---|---|
| 2,698,394 A | | 12/1954 | Brown |
| 3,539,887 A | | 11/1970 | Dennick |
| 4,265,141 A | | 5/1981 | Bowman |
| 4,741,685 A | | 5/1988 | Inaba et al. |
| 4,749,169 A | | 6/1988 | Pickles |
| 5,052,908 A | * | 10/1991 | Inaba et al. ............ 425/150 |
| 5,164,209 A | | 11/1992 | Goto |
| 5,289,096 A | * | 2/1994 | Takeda ............ 318/560 |
| 5,804,224 A | | 9/1998 | Inaba et al. |
| 5,832,816 A | * | 11/1998 | Seto et al. ............ 100/48 |
| 5,862,733 A | * | 1/1999 | Seto et al. ............ 83/552 |
| 6,708,723 B2 | | 3/2004 | Wong et al. |
| 7,097,148 B2 | | 8/2006 | DeWall et al. |
| 7,131,362 B1 | * | 11/2006 | Matsuda et al. ............ 83/227 |

* cited by examiner

*Primary Examiner* — Daniel P. Stodola
*Assistant Examiner* — Eric Chau
(74) *Attorney, Agent, or Firm* — Ingrassia Fisher & Lorenz, P.C.

(57) ABSTRACT

Electromechanical actuators (EMAs) include an output disposed at a location that is axially central between two EM devices. The EMAs include either one or two motors and an output mechanism. The motors are adapted to be energized and are operable, upon being energized, to either generate torques about a first axis or drive forces along a first axis. The output mechanism is responsive to the torques or forces to translate along a second axis that is perpendicular to the first axis.

3 Claims, 5 Drawing Sheets

DUAL DRIVE ELECTROMECHANICAL ACTUATOR WITH CENTER OUTPUT

TECHNICAL FIELD

The present invention generally relates to electromechanical actuators (EMAs) and, more particularly, to an EMA having two motor drives and an output that is centrally disposed between the two motor drives.

BACKGROUND

Actuators are used in myriad devices and systems. For example, many vehicles including, for example, aircraft, spacecraft, watercraft, and numerous other terrestrial and non-terrestrial vehicles, include one or more actuators to effect the movement of various control surfaces or components. In many applications such as, for example, aircraft flight surface control systems and missile thrust vector control systems, electromechanical actuators (EMAs) are used. An EMA typically includes an electric motor that, when properly energized, supplies a torque to a suitable actuation device, which in turn positions a control surface or component.

In some applications, there is a need for an EMA having a linear output along an axis that is orthogonal to the motor axis. Presently known EMAs that has such an output include a single EM device, such as a motor or voice coil, and a relatively complex mechanical linkage, such as a worm gear, to locate the output back to the axially central position. Although these known EMAs are generally useful, the complex mechanical linkage can adversely impact overall system weight, size, and cost.

Hence, there is a need for an EMA actuator that provides an output along an axis that is orthogonal to the motor axis without relying on a relatively complex mechanical linkage. The present invention addresses at least this need.

BRIEF SUMMARY

In one embodiment, and by way of example only, an actuator includes a first motor, a second motor, and an output mechanism. The first motor is adapted to be energized and is operable, upon being energized, to generate a first torque about a first axis. The second motor is adapted to be energized and is operable, upon being energized, to generate a second torque about the first axis. The output mechanism is disposed between the first motor and the second motor and is responsive to the first torque and to the second torque to translate along a second axis that is perpendicular to the first axis.

In another exemplary embodiment, an actuator includes a first linear motor, a second linear motor, and an output mechanism. The first linear motor is adapted to be energized and is operable, upon being energized, to generate a first drive force along a first axis. The second linear motor is adapted to be energized and is operable, upon being energized, to generate a second drive force along the first axis. The output mechanism is disposed between the first linear motor and the second linear motor and is coupled to receive the first drive force and the second drive force. The output mechanism is responsive to the first drive force and to the second drive force to translate along a second axis that is perpendicular to the first axis.

In still a further exemplary embodiment, an actuation control system includes a control and an actuator. The control is adapted to receive device position commands and is responsive to the device position commands to supply actuator control signals. The actuator is coupled to receive the actuator control signals and is operable, in response thereto, to supply an actuator drive force for positioning a device. The actuator includes a first motor, a second motor, and an output mechanism. The first motor is adapted to be energized and is operable, upon being energized, to generate a first torque about a first axis. The second motor is adapted to be energized and is operable, upon being energized, to generate a second torque about the first axis. The output mechanism is disposed between the first motor and the second motor and is responsive to the first torque and to the second torque to translate along a second axis that is perpendicular to the first axis.

In yet a further embodiment, an actuator includes a motor and an output mechanism. The motor is adapted to be energized and is operable, upon being energized, to generate a torque about a first axis. The output mechanism is responsive to the torque to translate along a second axis that is perpendicular to the first axis.

Furthermore, other desirable features and characteristics of the actuator and actuation control system will become apparent from the subsequent detailed description and the appended claims, taken in conjunction with the accompanying drawings and this background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Figure 1:
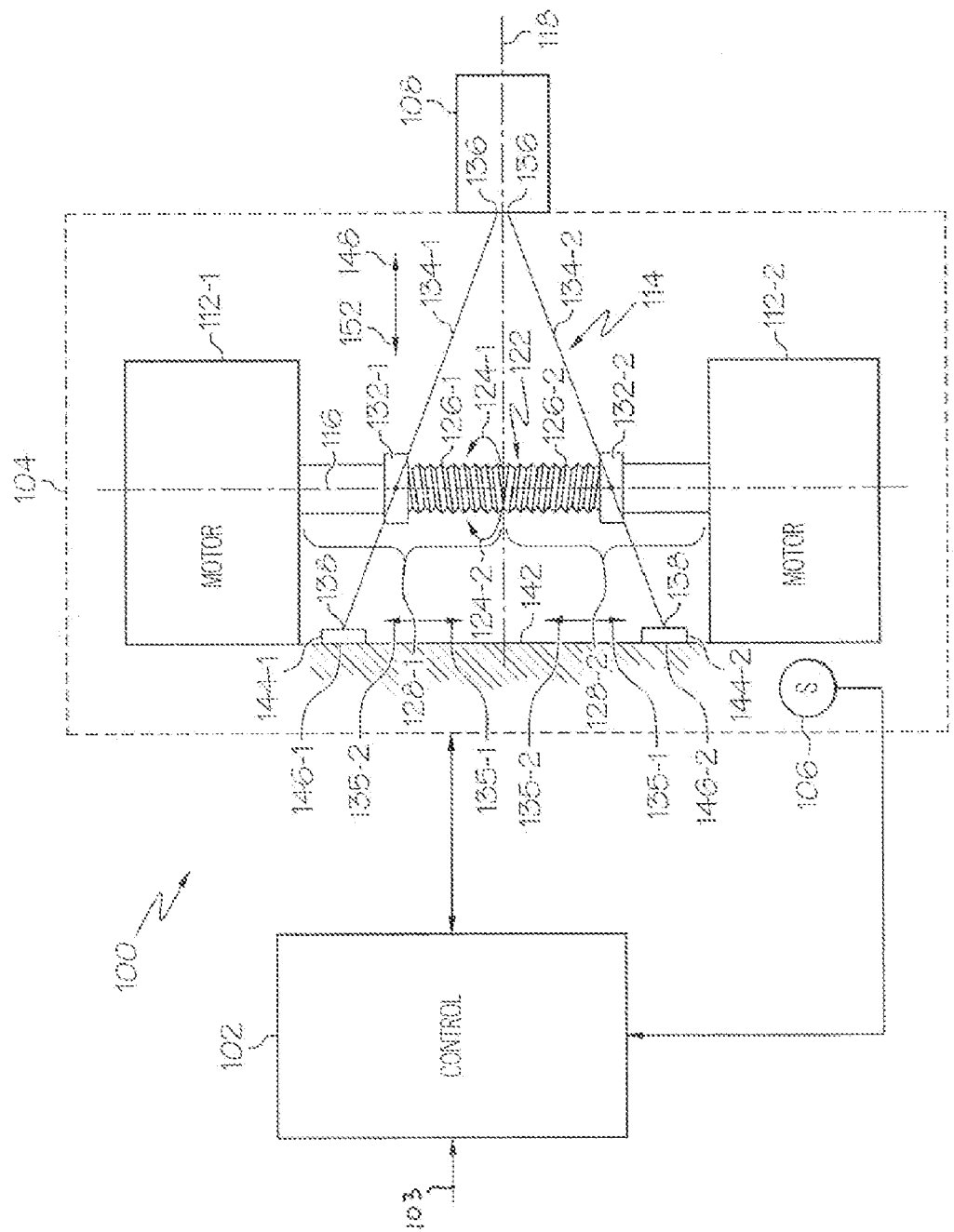
FIG. 1 is a functional block diagram of an exemplary actuation control system that includes an embodiment of an exemplary actuator depicted in its retracted position.

Referring first to FIG. 1, a functional block diagram of an actuation control system 100 is depicted. The depicted system 100 includes an actuator control 102 and an actuator 104. The actuator control 102 is adapted to receive device position commands 103 from, for example, a non-illustrated external system. In the depicted embodiment, the actuator control 102 also receives feedback signals supplied from one or more sensors 106. In the depicted embodiment only a single sensor 106 is shown since that is all that is needed for control in this embodiment. It will be appreciated, however, that additional sensors 106 may be provided. The actuator control 102, in response to the device position commands 103 and the feedback signals, supplies actuator control signals to the actuator 104, which causes the actuator 104 to be controllably energized from a non-illustrated power source. As will be described more fully below, the actuator 104, upon being controllably energized, moves a device 108 that is coupled to the actuator 104 to the commanded position.

It will be appreciated that the actuator control 102 may be variously configured to implement its functionality. For example, the actuator control 102 may be configured to implement a current control, a rate control, a position control, or various combinations of these controls. Moreover, the number and type of sensors used to sense and supply feedback signals to the actuator control 102 may vary depending, for example, and the type (or types) of controls that the actuator control 102 implements. A detailed description of these controls is not needed to fully describe or enable the claimed invention and will, therefore, not be further provided.

The actuator 104 is coupled to receive the actuator control signals supplied from the actuator control 102. The actuator 104 is operable, in response to the actuator control signals, to supply an actuator drive force to the device 108, for positioning the device 108 to the commanded position. To implement this functionality, the actuator 104 includes a pair of motors 112—a first motor 112-1 and a second motor 112-2—and an output mechanism 114. In the depicted embodiment, the motors 112 are each operable, upon being controllably energized from the non-illustrated power source, to generate a torque about a first axis 116. More specifically, the first motor 112-1 will generate a first torque about the first axis 116, and the second motor 112-2 will generate a second torque about the first axis 116. The output mechanism 114, which is disposed between the first motor 112-1 and the second motor 112-2, is responsive to the first torque and to the second torque to translate along a second axis 118 that is perpendicular to the first axis 116. It will be appreciated that the motors 112 may be implemented as any one of numerous types of AC or DC machines now known or developed in the future. Preferably, however, the motors 112 are each implemented as DC machines, and more particularly as either brush DC machines or brushless DC machines.

Before proceeding further it is noted that the motors 112 are preferably controlled and/or configured such that the first and second torques are equal (or at least substantially equal) in magnitude. This balancing of the motor outputs may be implemented either passively or actively. For example, if the motors 112 are implemented as DC motors (either brush or brushless) and are controllably energized together, the back EMF (electromotive force) and resistance changes due to thermal heating will act to passively balance the motor outputs. Active output balancing could be implemented by including separate sensors 106 on each motor 112 (e.g., separate position and/or commutation sensors) and/or a mechanical feature associated with the output mechanism 114. It is noted, however, that this method of implementing active output balancing is preferably used with the embodiments depicted in FIGS. 3 and 4, which are described further below.

No matter the specific manner in which the motor outputs are balanced, the torques generated by each are supplied to a common output shaft 122. The output shaft 122 is aligned along the first axis 116 and, in response to the first torque and the second torque supplied thereto from the motors 112, rotates about the first axis 116 in either a first rotational direction 124-1 or a second rotational direction 124-2. The output shaft 122, at least in the depicted embodiment, has plural sets of threads 126 formed on different sections 128. In particular, the output shaft 122 has first threads 126-1 formed on a first section 128-1, and second threads 126-2 formed on a second section 128-2 that is symmetrically and oppositely disposed relative to the first section 128-2. As may be appreciated, the shaft threads 126 are identically pitched (or at least substantially identically pitched). Moreover, because the shaft threads 126 are both disposed on the common output shaft 122, the first 126-1 and second 126-2 threads are oppositely-handed threads. That is, if the first threads 126-1 are formed as left-handed threads, then the second threads 126-1 are formed as right-handed threads, and vice-versa.

Turning now to the output mechanism 114, it is seen that this portion of the actuator 104 includes a first translation device 132-1, a second translation device 132-2, a first linkage 134-1, and a second linkage 134-2. The first translation device 132-1 is disposed on the output shaft 122 and has non-visible threads disposed thereon that mate with the first threads 126-1. The second translation device 132-2 is similar to the first translation device 132-1, is disposed on the disposed on the output shaft 122 and has non-visible threads disposed thereon that mate with the second threads 126-2. The first translation device 132-1 is thus configured, upon rotation of the output shaft 122 in the first rotational direction 124-1 and the second rotational direction 124-2, to translate along the first axis 116 in a first direction 135-1 and a second direction 135-2, respectively. Similarly, the second translation device 132-2 is configured, upon rotation of the output shaft 122 in the first rotational direction 124-1 and the second rotational direction 124-2, to translate along the first axis 116 in the second direction 135-2 and first second direction 135-1, respectively. In other words, when the output shaft 122 is rotated in the first rotational direction 124-1, the translation devices 132 translate toward each other along the first axis 116, whereas when the output shaft 122 is rotated in the second rotational direction 124-2, the translation devices 132 translate away from each other along the first axis 116. The movement of the translation devices 132 along the first axis 116 causes a translational movement of at least a portion of the output linkages 134 along the second axis 118.

The first linkage 134-1 and the second linkage 134-2 are coupled to the first translation device 132-1 and the second translation device 132-2, respectively, and each includes a first end 136 and a second end 138. The first and second linkages 134-1, 134-2 are pivotally coupled together at least proximate their respective first ends 136. The first and second linkages 134-1, 134-2 are also pivotally coupled, intermediate their respective first and second ends 136, 138, to the first and second translation devices 132-1, 132-2, respectively. As FIG. 1 further depicts, the first and second linkage second ends 138 are each adapted to engage an alignment surface 142. More specifically, the first and second link second ends 138 are each coupled to individual guides 144. That is, the first linkage second end 138 is coupled to a first guide 144-1, and the second linkage second end 138 is coupled to a second guide 144-2. The guides 144 each include a sliding face 146 (e.g., 146-1, 146-2) that engages the alignment surface 142. It is noted that the first and second linkages 134 at their respective first ends 136, and/or the individual guides 144 and the sliding face 146, anti-rotate the translation devices 132.

Figure 2:
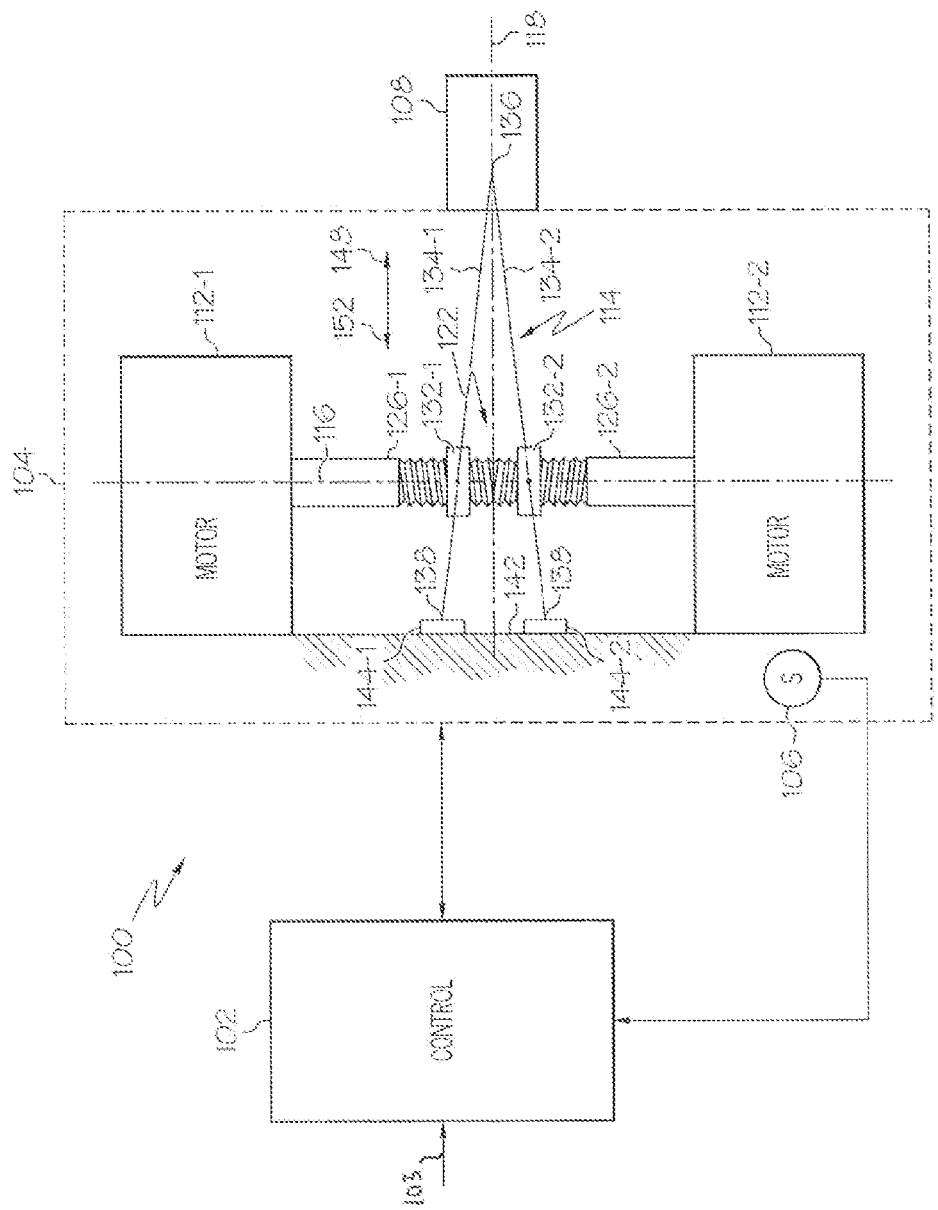
FIG. 2 is a functional block diagram of the exemplary actuation control system of FIG. 1 depicting the exemplary actuator in its extended position.

The actuator 104 is depicted in FIG. 1 in its fully retracted position. To move the actuator 104 to an extended position, the actuator control 102, in response to appropriate device position commands, controllably energizes the motors 112 to generate torques and cause the output shaft 122 to rotate in the first rotational direction 124-1. As noted above, rotation of the output shaft 122 in the first rotational direction 124-1 causes the first and second translation devices 132-1, 132-2 to translate toward each other along the first axis 116. As FIG. 2 depicts, this movement of the translation devices 132-1, 132-2 toward each other causes the output mechanism 114, and more specifically the first and second linkage first ends 136, to translate along the second axis 118 in a third direction 148 that is perpendicular to both the first 146-1 and second 146-2 directions. The movement of the output mechanism in the third direction 148 imparts a force that positions the device 108 to the commanded device position.

The skilled artisan will readily appreciate that the above-described movement results from the output mechanism first and second linkages 134-1, 134-2 being pivotally coupled together at least proximate their respective first ends 136, and being individually coupled to the first and second translation devices 132-1, 132-2, respectively. As FIG. 2 also depicts, as the first and second translation devices 132-1, 132-2 translate toward each other, the first and second guides 144-1, 144-2 slide along the alignment surface 142 toward each other. The skilled artisan will also readily appreciate that controllably energizing the motors 112 to generate torques and cause the output shaft 122 to rotate in the second rotational direction 124-2 will result in the output mechanism 114 moving back toward its fully retracted position. More specifically, the output mechanism 114 will move in a fourth direction 152 that is opposite the third direction 148.

The embodiments described above and depicted in FIGS. 1 and 2 are implemented using motors 112 that rotate and generate a torque. Moreover, the motors 112 share a common output shaft 122. Hence, the motors 112 are controlled to simultaneously rotate in the same direction. In other embodiments, the actuator 104 may be implemented without a common output shaft 122, and may also be implemented with linear motors. An embodiment in which the actuator 104 is implemented using motors 112 that generate torques, but coupled to separate output shafts, is depicted in FIG. 3 and will now be described.

Figure 3:
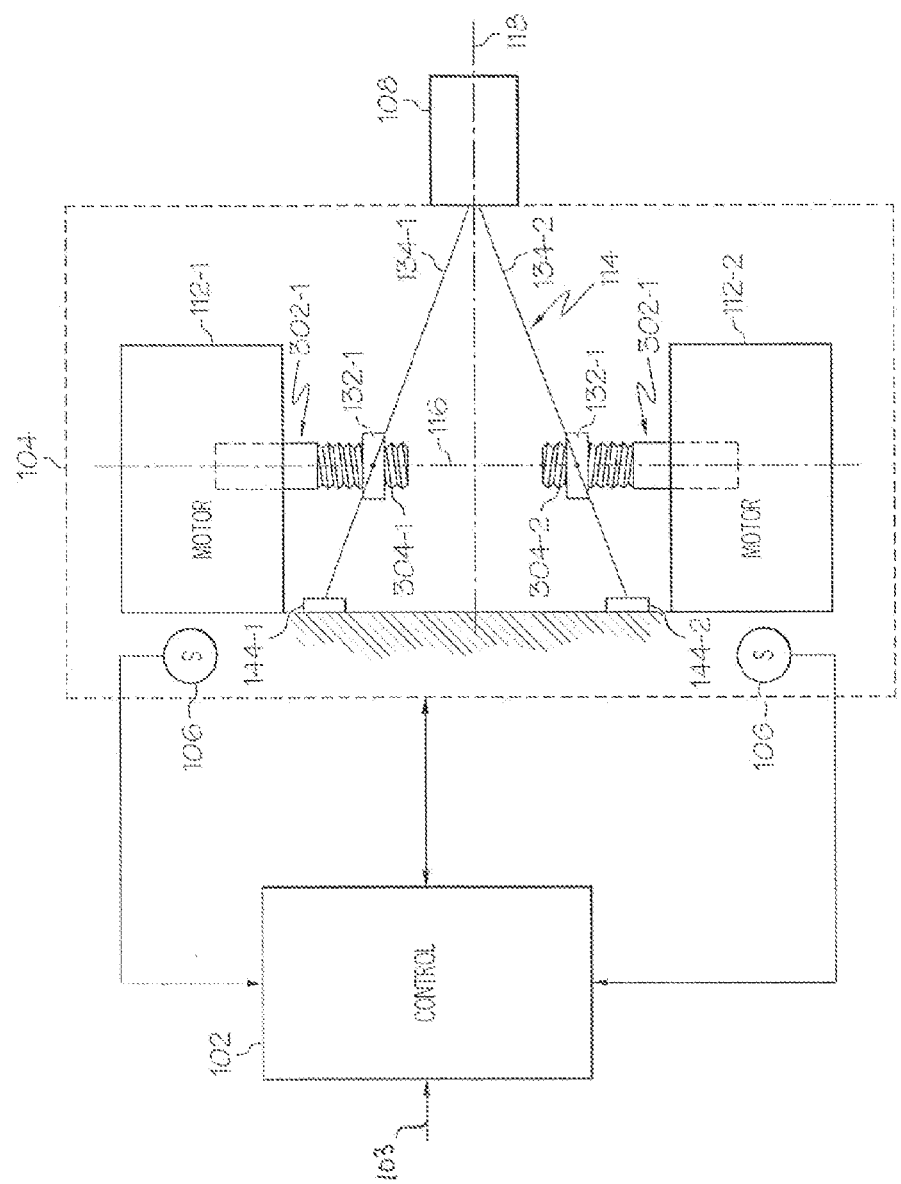
FIG. 3 is a functional block diagram of the exemplary actuation control system that includes an embodiment of an exemplary alternative actuator depicted in its retracted position.

As shown in FIG. 3, a first output shaft 302-1 is coupled to, and receives the first torque generated by, the first motor 112-1. Similarly, a second output shaft 302-1 is coupled to, and receives the second torque generated by, the second motor 112-2. First threads 304-2 are formed on the first output shaft 302-1, and second threads 304-2 are formed on the second output shaft 302-2. It will be appreciated that with this embodiment the first and second threads 304-1, 304-2 may be like-handed or oppositely-handed threads. Moreover, the motors 112 may be controlled to simultaneously rotate in either the same direction or opposite directions. In particular, if the first and second threads 304-1, 304-2 are oppositely-handed threads, then the motors 112 are controlled to simultaneously rotate in the same direction. Conversely, if the first and second threads 304-1, 304-2 are like-handed threads, then the motors 112 are controlled to simultaneously rotate in opposing direction.

Figure 4:
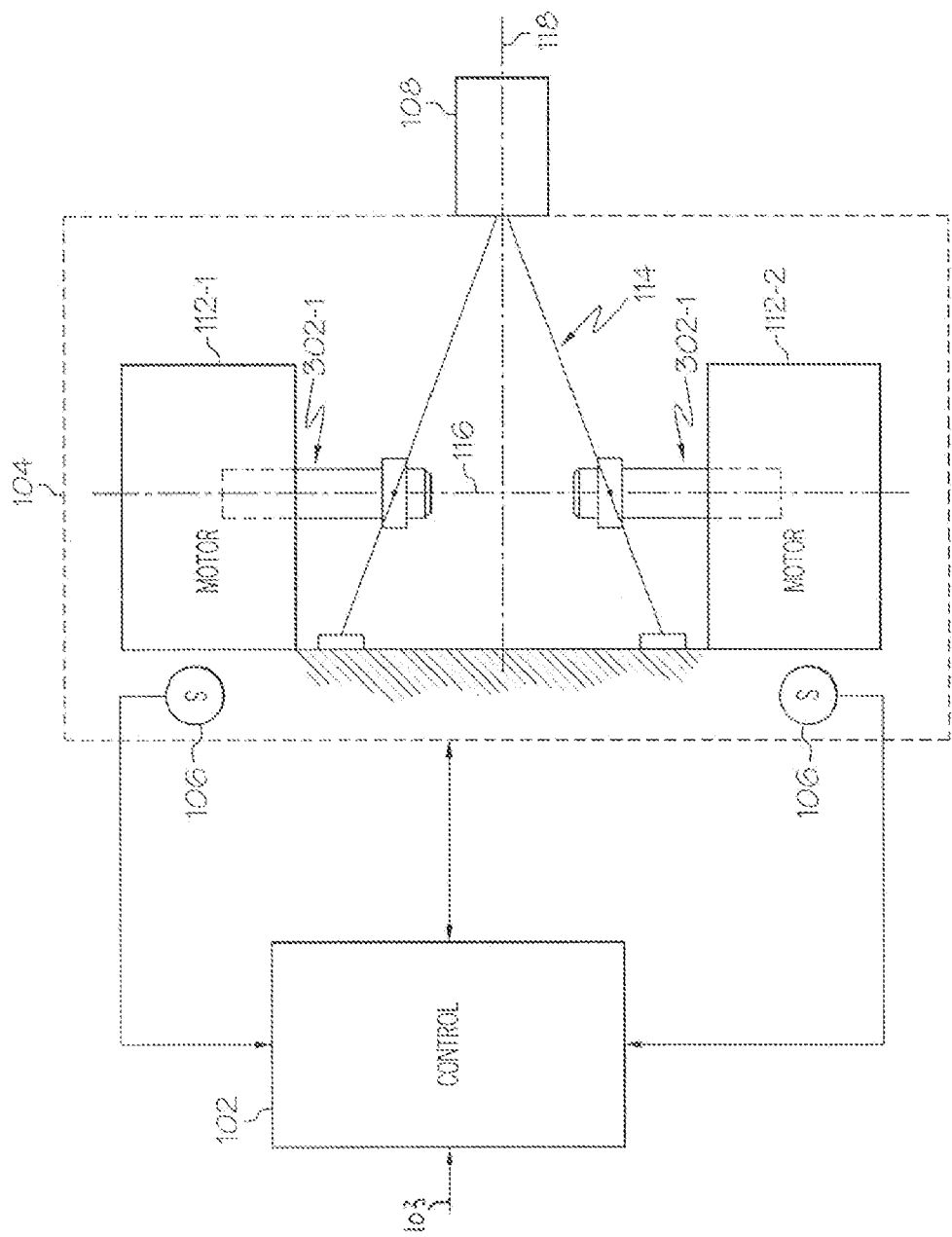
FIG. 4 is a functional block diagram of the exemplary actuation control system that includes an embodiment of yet another exemplary alternative actuator also depicted in its retracted position.

With quick reference to FIG. 4, an embodiment is depicted in which the motors 112 are implemented using linear motors, and individual output shafts 302 are used. Thus, upon being controllably energized, the linear motors 112 translate and generate a force, rather than rotate and generate a torque. Moreover, rather than being disposed on the output shafts 302 via threads 304, the translation devices 132 are coupled to the output shafts 302. It will be appreciated that with this embodiment, the translation devices 132 could be eliminated, and the first and second linkages 134-1, 134-2 could be coupled directly to the first and second output shafts 302-1, 302-2, respectively.

Figure 5:
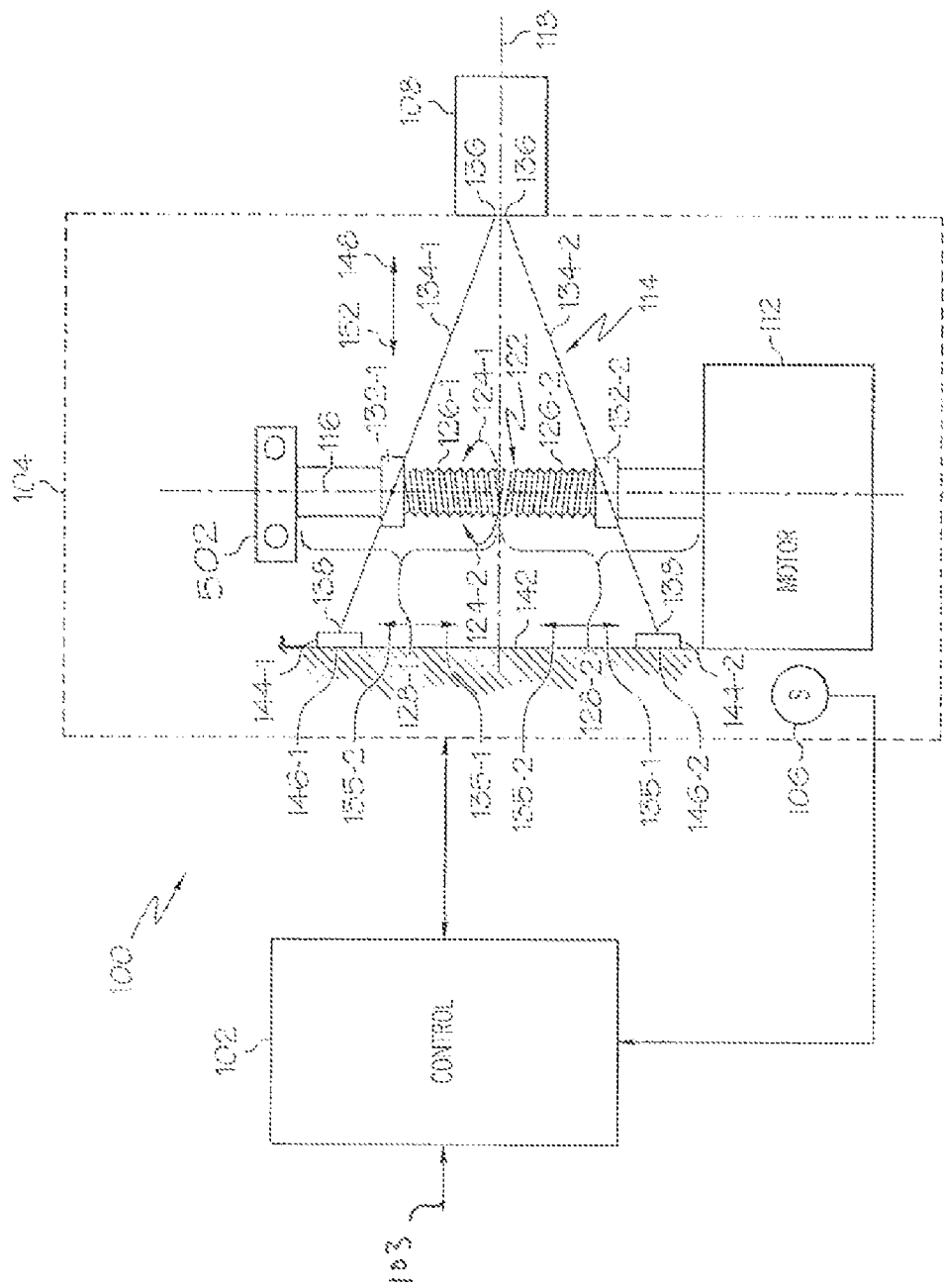
FIG. 5 is a functional block diagram of the exemplary actuation control system that includes an embodiment of yet another exemplary alternative actuator also depicted in its retracted position.

In addition to each of the previously described embodiments, the actuator 104 may be implemented with only a single motor (either the first motor 112-1 or the second motor 112-2), as depicted in FIG. 5. In this embodiment, one end of the output shaft 122 is supported by a suitable bearing 502. In addition, it will be appreciated that not only in this embodiment, but in all of the embodiments described herein, the alignment surface 142 need not be disposed as depicted in FIGS. 1-5, but instead could be moved either closer to or further from the first axis 116.

The electromechanical (EM) actuators disclosed herein provide an output at a location that is axially central between the EM devices, and does so without relying on a relatively complex mechanical linkage.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An actuator, comprising:
a first motor adapted to be energized and operable, upon being energized, to generate a first torque about a first axis;
a second motor adapted to be energized and operable, upon being energized, to generate a second torque about the first axis;
a first guide including a sliding face adapted to engage an alignment surface;
a second guide including a sliding face adapted to engage the alignment surface;
an output shaft coupled to the first motor and the second motor, and aligned along the first axis, the output shaft rotating about the first axis in response to the first torque and the second torque;
first threads formed on a first section of the output shaft;
second threads formed on a second section of the output shaft, the second section symmetrically and oppositely disposed relative to the first section; and
an output mechanism disposed between the first motor and the second motor and responsive to the first torque and to the second torque to translate along a second axis that is perpendicular to the first axis, the output mechanism comprising:
a first translation device disposed on the output shaft and having threads disposed thereon that mate with the first threads, the first translation device configured, upon rotation of the output shaft in a first rotational direction and a second rotational direction, to translate along the first axis in a first direction and a second direction, respectively;
a second translation device disposed on the output shaft and having threads disposed thereon that mate with the second threads, the second translation device configured, upon rotation of the output shaft in the first rotational direction and the second rotational direction, to translate along the first axis in the second direction and first second direction, respectively;
a first linkage including a first end and a second end; and
a second linkage including a first end and a second end;
wherein:

the first and second linkage first ends are pivotally coupled together at least proximate their respective first ends, the first linkage second end is directly coupled to the first guide, the second linkage second end is directly coupled to the second guide, the first linkage is directly coupled to the first translation device intermediate its first and second ends, and the second linkage is directly coupled to the second translation device intermediate its first and second ends.

2. The actuator of claim 1, wherein the first and second motors are identical and are selected from the group consisting of brushless DC machines and brush DC machines.

3. An actuator, comprising:

a first motor adapted to be energized and operable, upon being energized, to generate a first torque about a first axis;

a second motor adapted to be energized and operable, upon being energized, to generate a second torque about the first axis;

a first guide including a sliding face adapted to engage an alignment surface;

a second guide including a sliding face adapted to engage the alignment surface;

a first output shaft coupled to the first motor and aligned along the first axis, the first output shaft rotating about the first axis in response to the first torque; and a second output shaft coupled to the second and aligned along the first axis, the second output shaft rotating about the first axis in response to the second torque;

first threads formed on a the first output shaft;

second threads formed on the second output shaft; and an output mechanism coupled to the first shaft and the second shaft and responsive to the first torque and to the second torque to translate along a second axis that is perpendicular to the first axis, the output mechanism comprising:

a first translation device disposed on the first shaft and having threads disposed thereon that mate with the first threads, the first translation device configured, upon rotation of the first shaft in a first rotational direction and a second rotational direction, to translate along the first axis in a first direction and a second direction, respectively;

a second translation device disposed on the second shaft and having threads disposed thereon that mate with the second threads, the second translation device configured, upon rotation of the second shaft in the first rotational direction and the second rotational direction, to translate along the first axis in the second direction and first second direction, respectively;

a first linkage including a first end and a second end; and a second linkage including a first end and a second end;

wherein:

the first and second linkage first ends are pivotally coupled together at least proximate their respective first ends, the first linkage second end is directly coupled to the first guide, the second linkage second end is directly coupled to the second guide, the first linkage is directly coupled to the first translation device intermediate its first and second ends, and the second linkage is directly coupled to the second translation device intermediate its first and second ends.

* * * * *